(12) United States Patent
Przybylski

(10) Patent No.: US 6,424,873 B1
(45) Date of Patent: Jul. 23, 2002

(54) SYSTEMS AND METHODS FOR LIMITING INTEGRAL CALCULATION COMPONENTS IN PID CONTROLLERS

(75) Inventor: Frank J. Przybylski, Gwynedd Valley, PA (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/475,326

(22) Filed: Dec. 30, 1999

(51) Int. Cl.[7] ............................................... G05B 13/02
(52) U.S. Cl. ........................ 700/42; 700/8; 700/33; 318/610
(58) Field of Search ............................ 700/42, 41, 43, 700/8, 33; 318/610, 609

(56) References Cited

U.S. PATENT DOCUMENTS

| | | | |
|---|---|---|---|
| 4,721,448 A | * 1/1988 | Irish et al. | 425/144 |
| 4,993,480 A | * 2/1991 | Suzuki et al. | 165/254 |
| 5,059,880 A | * 10/1991 | Hiroi | 318/610 |
| 5,153,807 A | * 10/1992 | Saito et al. | 700/45 |
| 5,223,778 A | 6/1993 | Svarovsky et al. | 318/610 |
| 5,270,916 A | 12/1993 | Sexton et al. | 700/41 |
| 5,384,526 A | 1/1995 | Bennet | 318/610 |
| 5,420,490 A | 5/1995 | Jeon | 318/632 |
| 5,587,896 A | 12/1996 | Hansen et al. | 700/28 |
| 5,867,384 A | 2/1999 | Drees et al. | 700/42 |
| 5,903,185 A | 5/1999 | Ishida et al. | 123/399 |
| 5,971,579 A | 10/1999 | Kim | 700/42 |
| 6,240,324 B1 | * 5/2001 | Preska et al. | 700/8 |

FOREIGN PATENT DOCUMENTS

| | | | | |
|---|---|---|---|---|
| JP | 402083703 A | * | 3/1990 | G05B/13/00 |
| JP | 405313702 A | * | 11/1993 | G05B/11/36 |

* cited by examiner

Primary Examiner—Thomas Black
Assistant Examiner—Crystal J Barnes
(74) Attorney, Agent, or Firm—Novakov Davis & Munck

(57) ABSTRACT

A control apparatus is disclosed that comprises a primary proportional, integral, differential ("PID") controller capable of receiving a first setpoint and a first process variable and generating therefrom a second setpoint; and a secondary controller capable of receiving the second setpoint and a second process variable and generating therefrom an output control signal, wherein the primary PID controller is capable of receiving from the secondary controller a feedback signal 1) that indicates that a previous value of the second setpoint exceeds a limit associated with an output control signal of the secondary controller, and 2) that transfers a value of a signal from the secondary controller. The primary PID controller is then capable of limiting the contribution of the integral calculation component in a PID calculation that generates a new current value of the second setpoint. The integral calculation component may be excluded, included, or partially included in the PID calculation in order efficiently minimize the effect of undesirable erratic output signals.

20 Claims, 8 Drawing Sheets

SYSTEMS AND METHODS FOR LIMITING INTEGRAL CALCULATION COMPONENTS IN PID CONTROLLERS

TECHNICAL FIELD OF THE INVENTION

The present invention is directed, in general, to process control systems and, more specifically, to a process control system containing Proportional, Integral, Derivative ("PID") controllers.

BACKGROUND OF THE INVENTION

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Industrial control systems often employ feedback controllers for controlling the operation of one or more operating units of the system such as a heater, a pump, a motor, a valve, or a similar item of equipment. In a feedback controller a command is sent to the feedback controller that represents a desired value or setpoint ("SP") for a process variable (e.g., a desired pressure, a desired temperature, a desired flow rate). A feedback signal is also sent to the feedback controller that indicates the actual value of the process variable ("PV") (e.g., the actual pressure, the actual temperature, the actual rate of flow). An error signal is calculated utilizing the difference between the setpoint ("SP") command and the feedback signal that indicates the actual value of the process variable.

From the error signal, the feedback controller calculates a change command to change the current setting of the operational unit. For example, if the operational unit is a motor, the change command would cause the speed of the motor to change (either increase or decrease) in order to cause the actual value of the process variable to more closely approach the desired setpoint value for the process variable.

In a simple feedback controller, the change command is proportional to the error signal. In more complex feedback controllers, the change command may be a more complex function of the error signal. The relationship between the error signal and the change command greatly affects the characteristics of the control system. These characteristics include (a) the "response time" of the system (i.e., how fast the operational unit responds to the new change command); (b) the "overshoot" of the system (i.e., how much the operational unit initially exceeds its new setting); and (c) the "damping ratio" of the system (i.e., how long the output values of the operational unit oscillate before eventually stabilizing at the new setting).

Industrial control systems often employ a type of feedback controller known as a Proportional, Integral, Derivative ("PID") controller. PID controllers are capable of calculating a variety of functional relationships between an error signal and a change command signal in a feedback control system.

A PID controller may be used to calculate a functional relationship between an error signal and a change command signal that minimizes the time that the control system takes to reach a stable state following a change command signal. PID controllers are capable of operating in three modes. The modes are the Proportional mode, the Integral mode, and the Differential mode. PID controllers generate a proportional-integral-differential function that is the sum of (a) the error signal times a proportional gain factor ("P gain"), and (b) the integral of the error signal times an integral gain factor ("I gain"), and (c) the derivative of the error signal times the derivative gain factor ("D gain"). An appropriate selection of the three gain factors ("P", "I" and "D") must be made to calculate a transfer function that will result in a desirable system response. Selecting the three gain factors is sometimes referred to as "tuning" the PID controller.

In a PID controller the integral mode will continue to integrate the error as long as the error is not zero. This can cause the output of the PID controller to increase well beyond the acceptable output limits of the PID controller. When this occurs, the PID controller is said to be "wound up" or is said to be in a "wind up" state. A "wound up" PID controller can no longer affect the value of the process variable because the output of the PID controller is outside the operating range of the operational unit. For example, a valve may be fully open but the "wound up" PID controller is asking for the valve to be five hundred percent (500%) open. For an additional example, a motor may be operating at its maximum speed of five hundred revolutions per minute (500 RPM) but the "wound up" PID controller is asking for the motor to run at three thousand revolutions per minute (3,000 RPM).

When the sign of the error changes, the PID controller must "unwind" (i.e., cease causing an excessive output signal) before the output of the PID controller returns into the proper operating range. The process of "unwinding" may result in "overshoots" in the value of the process variable or may result in significant oscillations in the value of the process variable.

To prevent a PID processor from entering the "wound up" state it is possible to limit the contribution of the integral value when it is determined that the integral value contribution would cause the output signal to increase in the direction that will cause violation of the output limits. Implementing integral value limits in a PID controller is relatively simple because the upper and lower output limits are known, and the PID controller is able to determine whether the sum of the proportional value contribution (the "P contribution") and the derivative value contribution (the "D contribution") violates the output limits. If the sum of the P and D contributions do not violate the output limits, then a portion of (or all of) the integral value contribution (the "I contribution") may be included in the output signal up the level of the output limit. As will now be explained, this method is not sufficient in cases involving two coupled PID controllers.

Two PID controllers may be coupled to operate in a cascade structure. In such an arrangement, the primary PID controller sends an output signal to an input of the secondary PID controller. The primary PID controller also receives a feedback signal from the secondary PID controller. The primary PID controller performs a PID calculation to determine the output signal that it transfers to the secondary PID controller. The secondary PID controller is capable of determining that the output signal of the primary PID controller has exceeded an output limit for output signals that the secondary PID controller will transfer.

The method of limiting the integral value contribution described above for the case of a single PID controller is not sufficient in the case of two coupled PID controllers because (1) the output limits in the secondary PID controller are not available to the primary PID controller, and (2) the secondary PID controller may have two different types of output limits. Specifically, the secondary PID controller may have either setpoint limits or output limits (or both types of limits). It is possible to transfer setpoint limits from the secondary PID controller to the primary PID controller as constant values. But it is not possible to transfer the output limits of the secondary PID controller as constant values. In general, when integral value calculations are involved, the PID calculation algorithm of the primary PID controller cannot determine the output limits of the secondary PID controller without complete knowledge of the past history of the input values.

One prior art method limits the integral value contribution in a primary PID controller (that is coupled to a secondary PID controller) by including or excluding the integral value contribution in response to information received from the secondary PID controller via limit flags. This prior art method causes the secondary PID controller to set an Integral High Limit Flag when the secondary PID controller has determined that its upper output limit has been exceeded. The secondary PID controller then sends information to the primary PID controller on a feedback signal line stating that the Integral High Limit Flag has been set. The secondary PID controller will not transfer the signal at the level that it received it from the primary PID controller. Instead, the secondary PID controller transfers its output signal at its normal output high limit.

The primary PID controller is capable of determining that the Integral High Limit Flag has been set by the secondary PID controller. Because the Integral High Limit Flag has been set, the primary PID controller will not include the integral value contribution in the next PID calculation. This may be done by subtraction or by multiplying the integral value by a scale factor of zero ("0").

Thus, the next PID calculation will be one without any integral value contribution. The signal created by this PID calculation is usually within the range of outputs that is acceptable to the secondary PID controller. The secondary PID controller then transfers this output signal.

Because this most recent signal does not exceed the secondary PID controller's output limit, the secondary PID controller may reset the Integral High Limit Flag to zero. The secondary PID controller then sends information to the primary PID controller on a feedback signal line stating that the Integral High Limit Flag has been reset to zero. Because the Integral High Limit Flag has been reset to zero, the primary PID controller will include the integral value contribution in the next PID calculation. This usually results in the next PID calculation causing the next output signal to once again exceed the upper output limit of the secondary PID controller's output.

The steps described above continue to be repeated in a cycle until the PID calculations of the primary PID controller create a signal that falls within the acceptable output signal limits of the secondary PID controller.

This is an undesirable feature because it can cause a system response that swings back and forth between levels that are too high and levels that are too low. For example, this can cause an operational unit such as a valve to repeatedly open and close very quickly. It could also cause an operational unit such as a motor to repeatedly turn off and on very quickly. The erratic output signals caused by this method of limiting the integral value contribution cause the performance of the control system to suffer.

There is therefore a need for improved systems and methods for limiting the integral value contribution in a PID calculation in PID controllers that are coupled in a cascade configuration.

SUMMARY OF THE INVENTION

The purpose of the present invention is to provide improved systems and methods for limiting the integral value contribution to a PID calculation in a primary PID controller that is coupled in cascade with a secondary PID controller in order to avoid the undesirable erratic output signals that are created by using prior art methods. The method of the present invention makes it possible to prevent unnecessary wear and tear on the operational units that would otherwise have to respond to erratic output signals.

The present invention utilizes (1) a previous value of an output signal of the primary PID controller, or (2) a feedback signal from the secondary PID controller in order to determine whether to limit the integral value contribution in the next PID calculation.

The systems and methods of the present invention may be used in any type of process control system comprising a primary PID controller for controlling a first process variable coupled to a secondary controller (which may or may not be a PID controller) for controlling a second process variable. In an advantageous embodiment of the present invention the secondary controller is a PID controller. The secondary controller, however, may be an analog output unit or may be any type of controller that has setpoint limits or output limits (or both) and that is capable of setting limit flags and sending feedback signals as a PID controller does. In the description that follows the secondary controller will be referred to as a secondary PID controller. But it is to be borne in mind that the secondary controller may also be a non-PID controller.

When a primary PID controller is coupled in cascade with a secondary PID controller, the primary PID controller sends an output signal to the secondary PID controller and the secondary PID controller sends a feedback signal to the primary PID controller. The secondary PID controller is capable of determining that the output signal of the primary PID controller has exceeded a setpoint signal limit. The setpoint signal limit may be an upper setpoint signal limit, or a lower setpoint signal limit. It is also possible that the secondary PID controller will simultaneously use both an upper setpoint signal limit and a lower setpoint signal limit.

The primary PID controller performs a PID calculation to determine the output signal that the primary PID controller sends to the secondary PID controller. The PID calculation is the sum of a proportional calculation component and an integral calculation component and a derivative calculation component.

When the secondary PID controller determines that a previous output signal of the primary PID controller has exceeded a setpoint signal limit, it becomes necessary for the primary PID controller to make adjustments to the next output signal that the primary PID controller sends to the secondary PID controller. This requires the primary PID controller to make adjustments to the next PID calculation. The present invention provides improved systems and methods for limiting the contribution of the integral calculation component to such a PID calculation.

The present invention limits the contribution of the integral calculation component in a PID calculation by multiplying the integral calculation component by zero in response to a determination that the current sum of a proportional calculation component and a derivative calculation component of the PID calculation exceeds a previous value of an output signal of the PID controller. Equivalent to multiplying the integral calculation component by zero, the entire integral calculation component may simply be excluded from the PID calculation.

The present invention also limits the contribution of the integral calculation component in a PID calculation by multiplying the integral calculation component by a non-zero scale factor having a value between zero and one in response to a determination that the inclusion of the integral calculation component in the current PID calculation would otherwise cause the current value of the output signal of the PID controller to exceed a previous value of the output signal of the PID controller. Equivalent to multiplying the integral calculation component by a non-zero scale factor, the portion of the integral calculation component contributing the excess value of the output signal may simply be excluded from the PID calculation.

It is an object of the present invention to provide improved systems and methods for limiting the contribution of an integral calculation component in a PID calculation in a control apparatus having an upper output signal limit.

It is also an object of the present invention to provide improved systems and methods for limiting the contribution of an integral calculation component in a PID calculation in a control apparatus having a lower output signal limit.

It is an additional object of the present invention to provide improved systems and methods for limiting the contribution of an integral calculation component in a PID calculation in a control apparatus having both an upper output signal limit and a lower output signal limit.

It is an object of the present invention to provide improved systems and methods for limiting the contribution of an integral calculation component in a PID calculation in a control apparatus having an upper setpoint signal limit.

It is also an object of the present invention to provide improved systems and methods for limiting the contribution of an integral calculation component in a PID calculation in a control apparatus having a lower setpoint signal limit.

It is an additional object of the present invention to provide improved systems and methods for limiting the contribution of an integral calculation component in a PID calculation in a control apparatus having both an upper setpoint signal limit and a lower setpoint signal limit.

It is a further object of the present invention to provide improved systems and methods for avoiding undesirable erratic output signals that are present in prior art PID controllers.

It is an additional object of the present invention to provide improved systems and methods for limiting the contribution of an integral calculation component in a PID calculation in a control apparatus having both output signal limits and setpoint signal limits.

It is another object of the present invention to provide improved systems and methods for preventing unnecessary wear and tear in operational units that have to respond to the erratic output signals that are present in prior art PID controllers.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
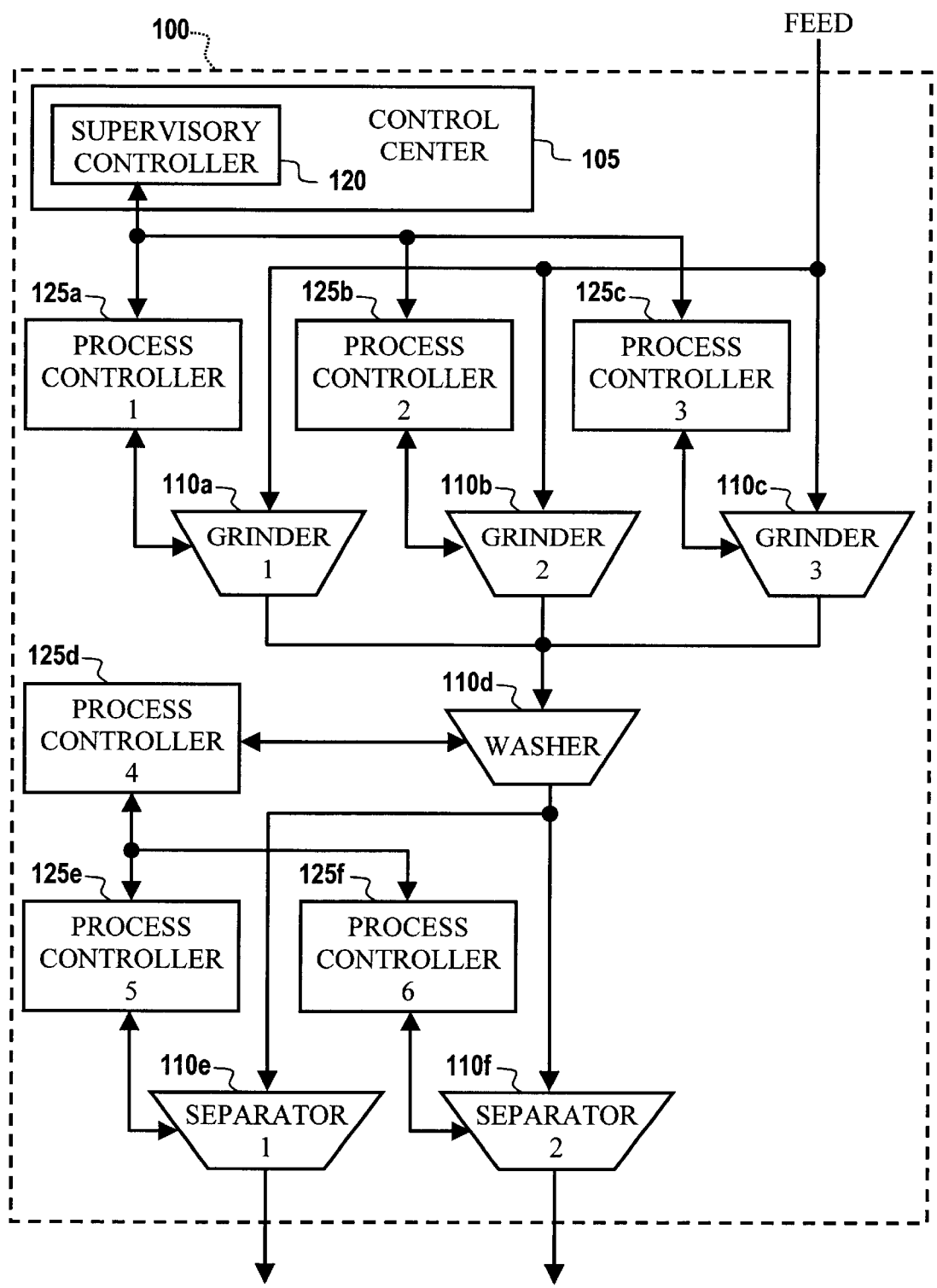
FIG. 1 illustrates a block diagram of a process facility in which a control system according to the principles of the present invention may be used.

FIG. 1 illustrates a block diagram of a process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110f that receive a feed of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory controller 120 and six process nodes, or process controllers 125a–125f, each of which is implemented in software and executable by a suitable conventional computing system (standalone or network), such as any of Honeywell, Inc.'s AM K2LCN, AM K4LCN, AM HMPU, A×M or like systems. Those skilled in the art will understand that such controllers may be implemented in hardware, software, or firmware, or some suitable combination of the same. In general, the use of computing systems in control systems for process facilities is well known.

Supervisory controller 120 is associated with each of process controllers 125, directly or indirectly, to allow the exchange of information. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

Supervisory controller 120 communicates with associated processes 110 via process controllers 125 and generates supervisory data in order to optimize process facility 100. The phrase "supervisory data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the supervisory data is dynamically generated and is based at least upon a given facility's efficiency, production or economic cost, and most preferably all three.

Process controllers 125 monitor associated processes 110 and operate to varying degrees in accordance with the supervisory data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the supervisory data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

FIG. 1 depicts the process controllers 125a–f as simple logical blocks coupled to the processes 110a–f for purposes of illustration only. In reality, the process controllers 125a–f may be implemented in process facility 100 as any of a wide range of devices. In the simplest embodiments, an exemplary process controller 125 may be micro-controller circuit fabricated on a circuit board and integrated into one of the processes 110 (i.e., part of a separator, washer, or grinder) that is being controlled. In other embodiments, an exemplary process controller 125 may be a stand-alone computer, such as a personal computer ("PC"), that is remote from the controlled process 110 and coupled to it by a bus architecture.

In more complex embodiments, an exemplary process controller 125 may be a network node coupled to one or more process(es) 110 by a network architecture. The supervisory controller 120 may then treat the network containing the exemplary process controller 125 and its associated processes 110 as a single functional group. Finally, an exemplary process controller 125 may be a group of process controllers and their associated processes 110 that are networked together. The networked group may then be treated as a single functional group by supervisory controller 120.

The process controllers 125a–f produce process data that is used by the supervisory controller 120 for a variety of purposes, including generating the supervisory data and distributing the process data to one or more client applications. Process data may also be used by the process controller 125 that produced it to control the associated process 110. For example, a process controller 125 may read physical parameter data from a process 110, such as temperature, pressure, flow rate, and the like, and use some or all of that process data and, perhaps, some supervisory data to control the process 110. This is particularly true in a feedback-controlled process.

Process data may be transferred directly between process controllers 125a–f in a peer-to-peer relationship, as in a LAN network. For example, process controller 4, which controls the washer (item 110d), may request process data from process controllers 1–33, which control grinders 1–33, in order to determine the rate at which ground raw material is being output from grinders 1–33. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, the supervisory controller 120 may comprise a LAN, a group of connected LANs, or a WAN architecture. One or more client applications are executed on nodes of the LAN/WAN architecture. The nodes may be, for example, personal computers ("PCs"). The client applications may all require the same process data and supervisory data to be transferred at the same update rate from the process controllers. However, a more likely scenario is that the client applications require different, possibly over-lapping, subsets of the process data and supervisory data and require the process data and supervisory data to be transferred at different update rates to different client applications.

Figure 2:
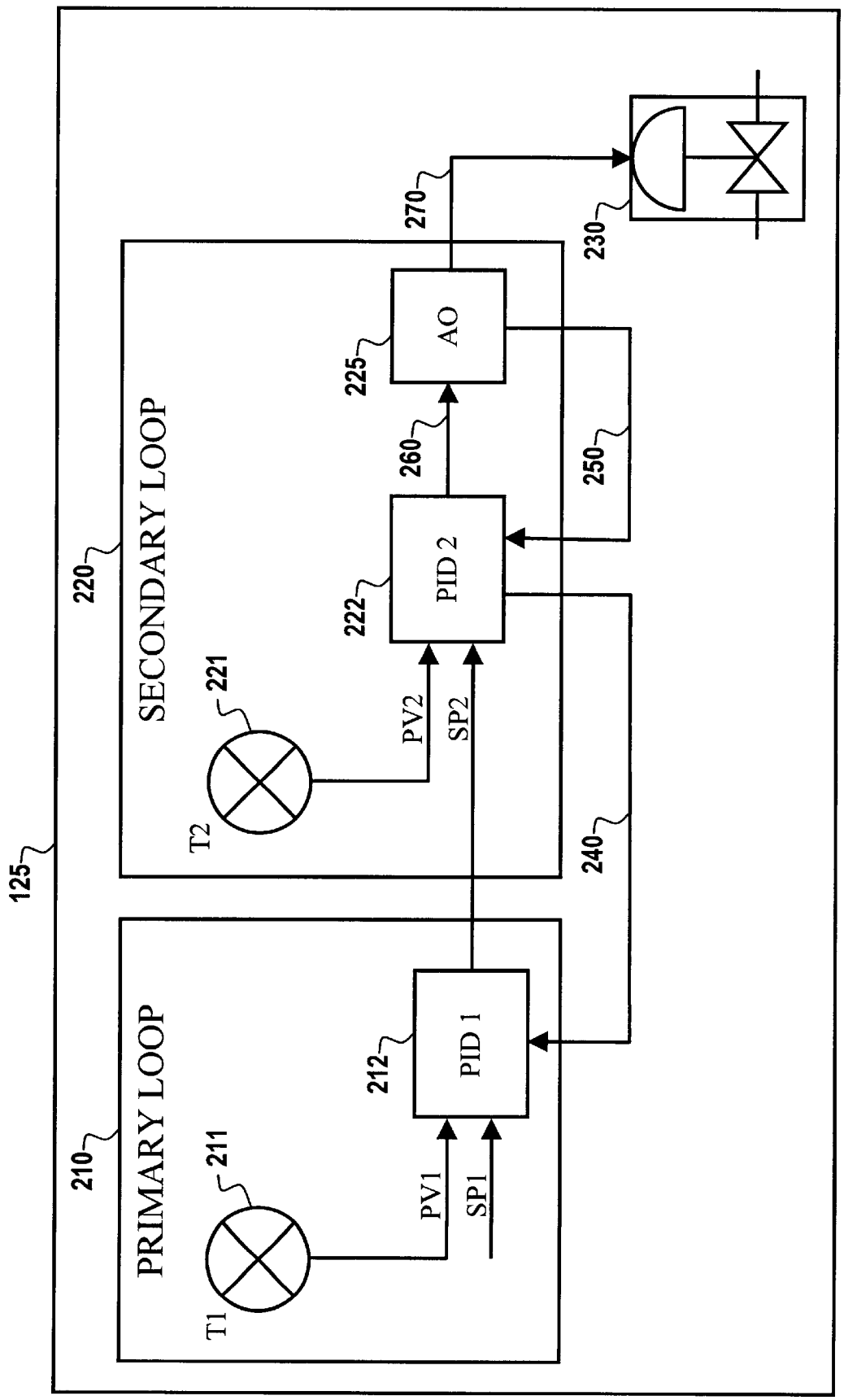
FIG. 2 illustrates a generic control system using cascaded control loops comprising Proportional, Integral, Differential ("PID") controllers according to one embodiment of the present invention.

In accordance with the principles of the present invention, one or more of the process controllers 125a–f may be implemented as cascaded control loops containing PID controllers. FIG. 2 illustrates a generic process control system using cascaded control loops containing two PID controllers for use in process controller 125 according to one embodiment of the present invention. Process controller 125 comprises primary loop 210, secondary loop 220, and valve 230.

Primary loop 210 comprises primary PID controller 212 ("PID1") and transmitter 211 ("T1"). Transmitter 211 is a measurement device capable of measuring the actual value of a first process variable ("PV1") and sending a signal representative of that value to primary PID controller 212. Primary PID controller 212 also receives a first setpoint value ("SP1") representative of the desired operating point. Primary PID controller 212 is also capable of receiving a feedback signal from secondary PID controller 222 on feedback signal line 240. Primary PID controller 212 produces an output that comprises a second setpoint value ("SP2") that is used by secondary loop 220 and secondary PID controller 222.

Secondary loop 220 comprises secondary PID controller 222 ("PID2") and transmitter 221 ("T2") and analog output unit 225 ("AO"). Transmitter 221 is a measurement device capable of measuring the actual value of a second process variable ("PV2") and sending a signal representative of that value to secondary PID controller 222. Secondary PID controller 222 receives the second setpoint value SP2 from the output of primary PID controller 212. Secondary PID controller 222 is also capable of receiving a feedback signal from analog output unit 225 on feedback signal line 250. Secondary PID controller 222 is coupled to analog output unit 225 via output signal line 260. Lastly, analog output unit 225 is coupled to valve 230 via signal line 270. The process controller 125 described above shows generally how primary PID controller 212 and secondary PID controller 222 may be interconnected.

Figure 3:
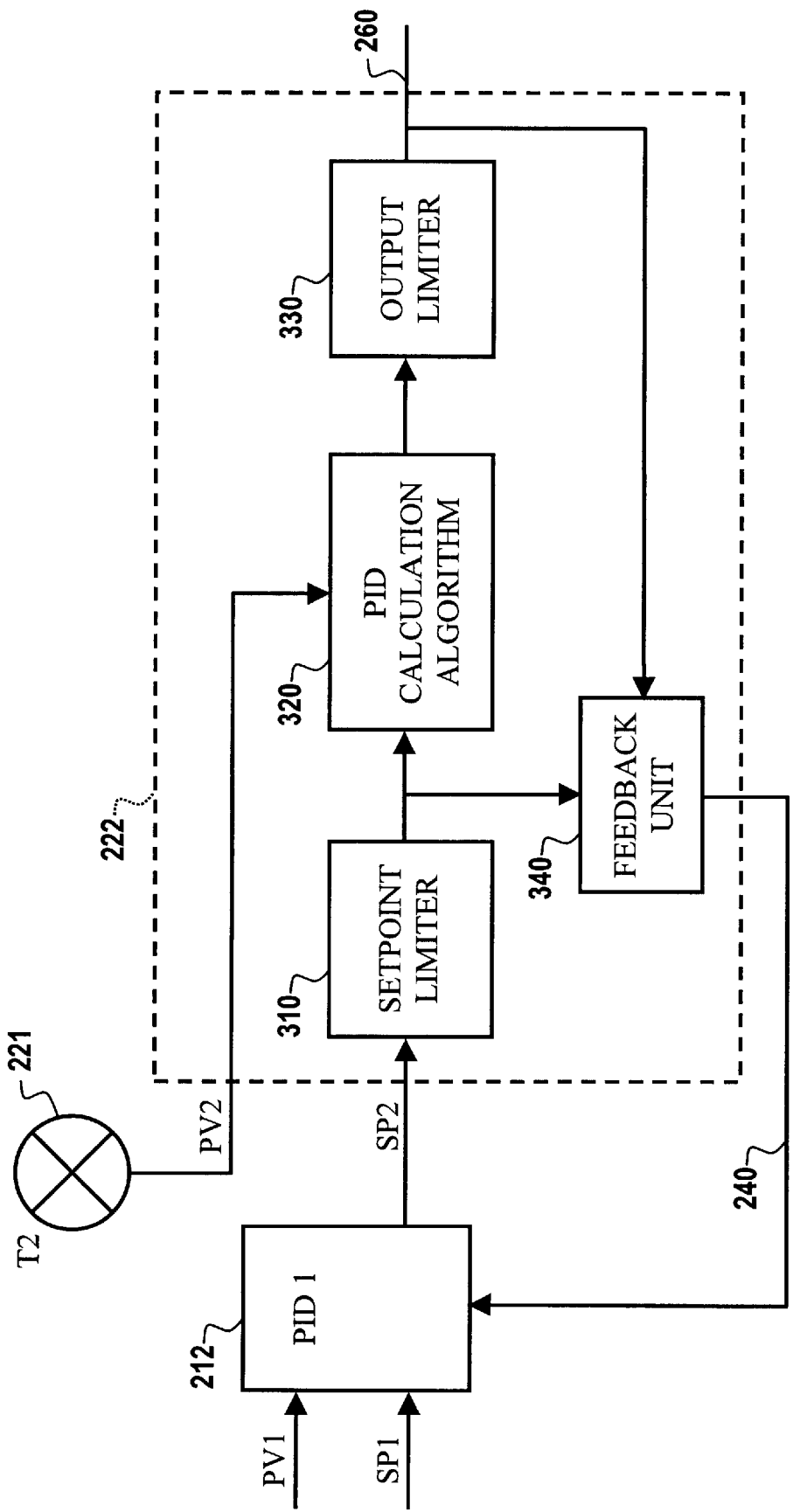
FIG. 3 illustrates a block diagram of one type of PID controller showing the interconnection of a setpoint limiter, a PID calculation algorithm unit, and an output limiter.

FIG. 3 shows a block diagram of secondary PID controller 222 showing the interconnection of setpoint limiter 310, PID calculation algorithm unit 320, output limiter 330, and feedback unit 340. Secondary PID controller 222 receives second setpoint signal SP2 from primary PID controller 212 in setpoint limiter 310. If the value of second setpoint signal SP2 is within the range of setpoint limits that setpoint limiter 310 will accept, then the value of second setpoint signal SP2 is sent to PID calculation algorithm 320 and is also sent to primary PID controller 212 via feedback unit 340 and feedback signal line 240. If setpoint limiter 310 determines that the value of second setpoint signal SP2 exceeds a setpoint limit (either a "high" setpoint limit or a "low" setpoint limit), then setpoint limiter 310 sets the value of second setpoint signal SP2 equal to the value of the setpoint limit that has been exceeded. The value of second setpoint signal SP2 as modified (i.e., set equal to the setpoint limit that was exceeded) is passed to PID calculation algorithm 320 and is also sent to primary PID controller 212 via feedback unit 340 and feedback signal line 240. In addition, setpoint limiter 310 sets the appropriate limit flag (either a "high" setpoint limit flag or a "low" setpoint limit flag) and sends the limit flag values to primary PID controller 212 via feedback unit 340 and feedback signal line 240.

PID calculation algorithm unit 320 receives a second process variable signal PV2 from transmitter 221. PID calculation algorithm 320 calculates an output signal using the second setpoint signal SP2 and the second process variable signal PV2. Output limiter 330 receives the output signal from PID calculation algorithm unit 320. If the value of the received output signal is within the range of output limits that output limiter 330 will accept, then the value of the output signal is sent to analog output unit 225 via signal line 260. The value of the output signal is also sent to primary PID controller 212 via feedback unit 340 and feedback signal line 240.

If output limiter 330 determines that the value of the output signal exceeds an output limit (either a "high" output limit or a "low" output limit), then output limiter 330 sets the value of the output signal equal to the value of the output limit that has been exceeded. The value of the output signal as modified (i.e., set equal to the output limit that was exceeded) is sent to analog output unit 225 via signal line 260. The value of the output signal as modified is also sent to feedback unit 340. Feedback unit 340 does not send the value of the output signal as modified to primary PID controller 212. Instead, output limiter 330 sets appropriate setpoint limit flags and sends the setpoint limit flag values to primary PID controller 212 via feedback unit 340 and feedback signal line 240. A "high" setpoint limit flag is set if the output signal has exceeded a "high" output limit. A "low" setpoint limit flag is set is the output signal has exceeded a "low" output limit.

The embodiment of secondary PID controller 222 shown in FIG. 3 has both a setpoint limiter 310 and an output limiter 330. There are some PID controllers that have a setpoint limiter but no output limiter. Conversely, there are some PID controllers that have an output limiter but no setpoint limiter.

Figure 4:
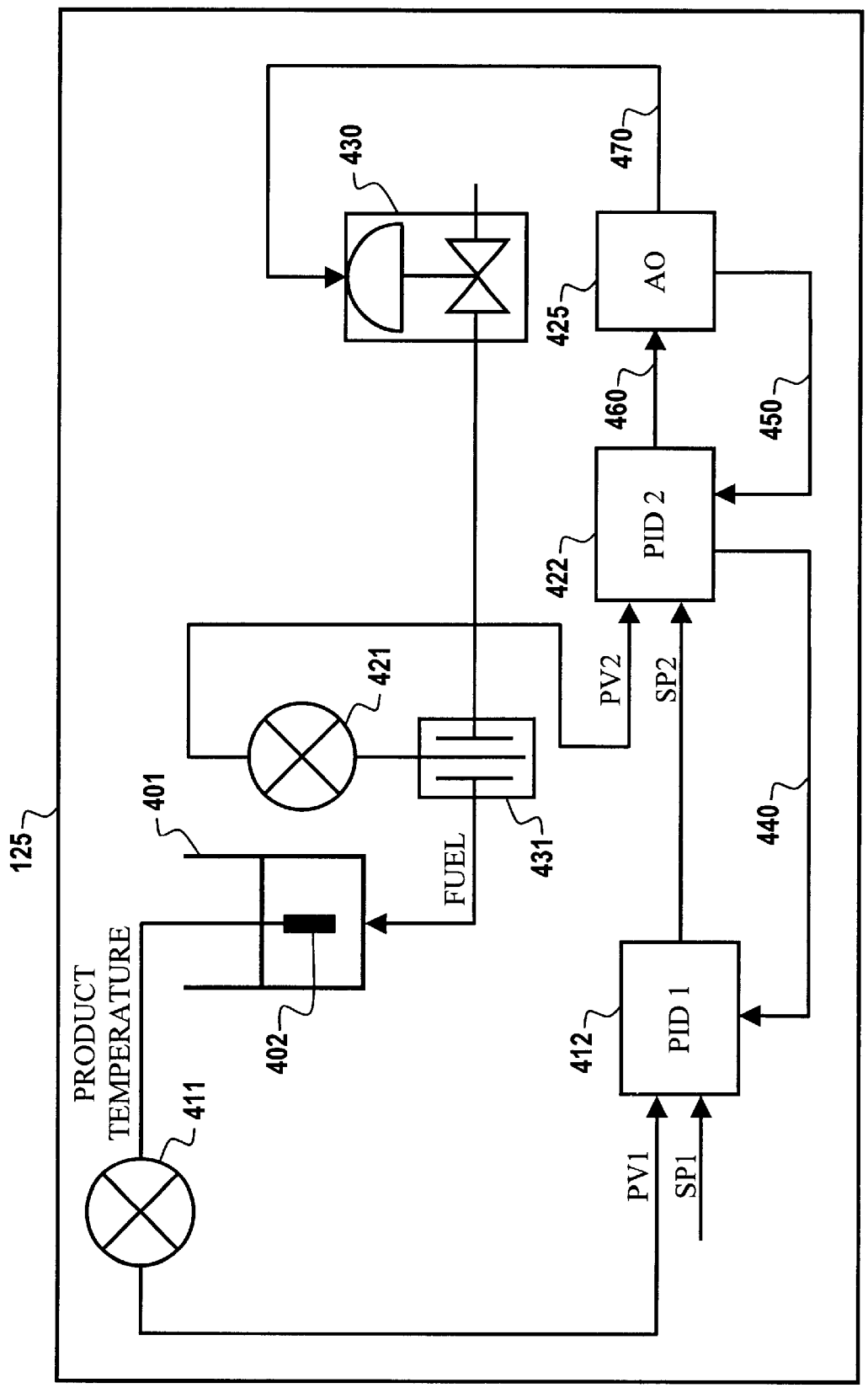
FIG. 4 illustrates a specific control system using cascaded control loops comprising PID controllers according to one embodiment of the present invention.

FIG. 4 illustrates process controller 125 comprising a specific control system using cascaded control loops containing two PID controllers according to one embodiment of the present invention. The exemplary feedback control system regulates the temperature of a product (e.g., a liquid) that is contained within vessel 401 and regulates the rate of fuel flow to a heater that heats the product.

The temperature PV1 of the product in vessel 401 is continuously measured by thermometer 402 and recorded by transmitter 411. The product temperature is increased or decreased by increasing or decreasing the amount of fuel delivered to a heater that heats vessel 401. The rate of fuel flow is regulated by the operation of valve 430. Specifically, the amount of the opening of valve 430 determines how fast fuel flows to the heater.

Valve 430 can be fully closed, or fully open, or partially open at any one of a number of different opening sizes. Flow meter 431 continuously measures the actual rate of flow PV2 of the fuel delivered to the heater by valve 430. The measured fuel flow rate is continuously recorded by transmitter 421.

Transmitter 411 continuously sends the product temperature, PV1, to primary PID controller 412. Primary PID controller 412 also receives a primary setpoint value SP1 which represents the desired product temperature. Primary PID controller 412 also receives a feedback signal from secondary PID controller 422 on feedback signal line 440. Primary PID controller 412 generates an output signal SP2 that is the setpoint value for secondary PID controller 422.

Transmitter 421 continuously sends the fuel flow rate PV2 to secondary PID controller 422. Secondary PID controller 422 receives the second setpoint value SP2 from the output of primary PID controller 412. Secondary PID controller 422 also receives a feedback signal from analog output unit 425 on feedback signal line 450. Secondary PID controller 422 is coupled to analog output unit 425 via output signal line 460. Lastly, analog output unit 425 is coupled to valve 430 via signal line 470.

Figure 5:
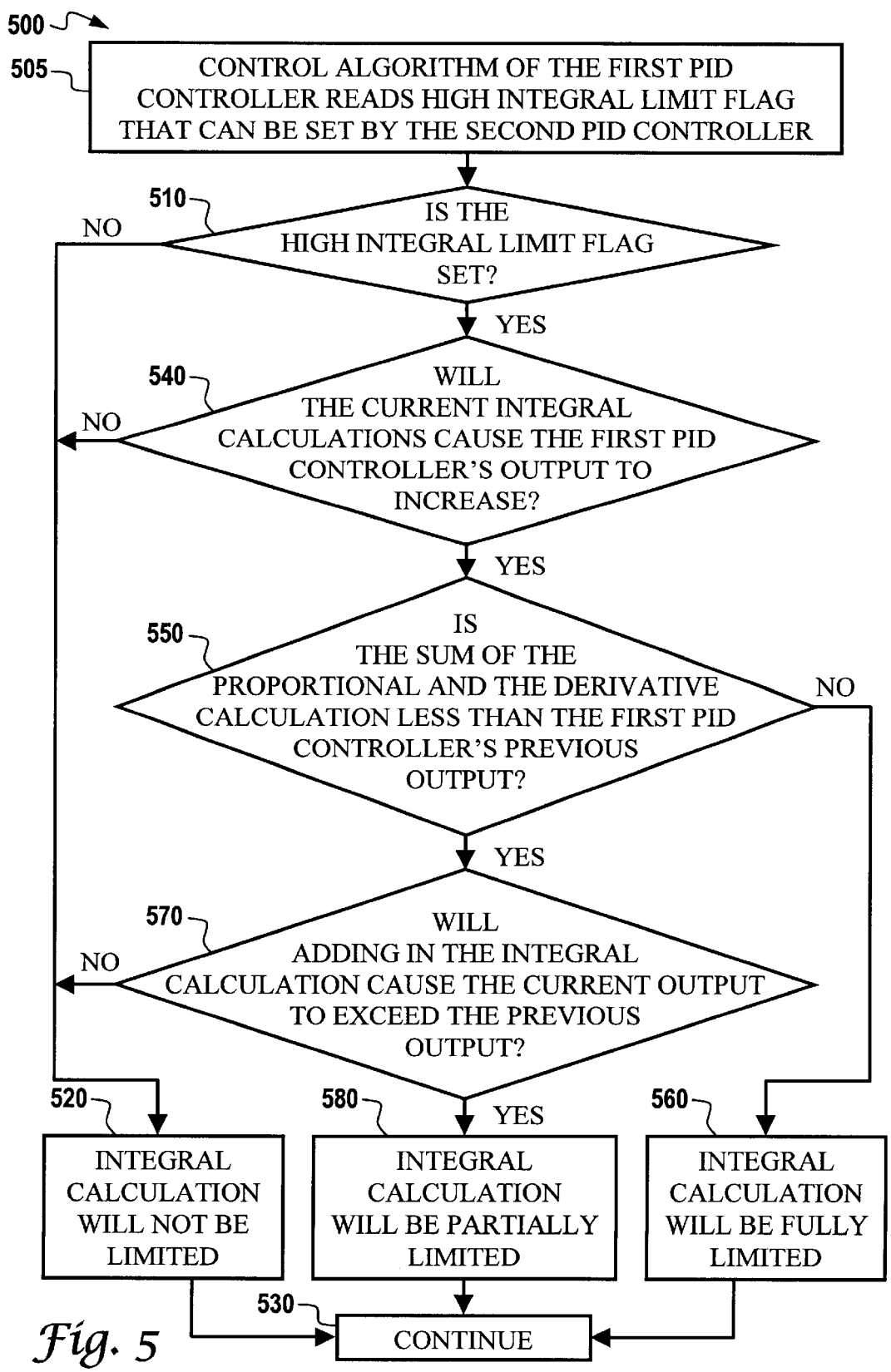
FIG. 5 is a flow diagram illustrating one embodiment of the present invention for limiting the integral calculation component in a PID calculation in a primary PID controller that is coupled in cascade with a secondary PID controller that has a high setpoint limit.

FIG. 5 depicts flow diagram 500, which illustrates the operation of process controller 125, which contains two cascaded PID controllers according to one embodiment of the present invention. The operation in flow diagram 500 limits the integral value contribution to a PID calculation in a primary PID controller that is coupled in cascade to a secondary PID controller that has a high setpoint limit. For the purpose of illustration, flow diagram 500 will be described with reference to the circuit shown in FIG. 4. That is, the primary PID controller shall be primary PID controller 412 and the secondary PID controller shall be secondary PID controller 422.

Primary PID controller 412 performs a PID calculation to determine what output signal that it will transfer to secondary PID controller 422. Secondary PID controller 422 is capable of determining whether the output signal received from primary PID controller 412 exceeds an upper setpoint limit established by secondary PID controller 422 for output signals transferred by secondary PID controller 422.

The control algorithm of primary PID controller 412 comprises a software accessible location which is capable of containing a digital numerical value ("1" or "0") representing the set state and the reset state, respectively, of a High Integral Limit Flag. Secondary PID controller 422 also comprises a similar software accessible location containing a High Integral Limit Flag. Secondary PID controller 422 is capable of setting or resetting its High Integral Limit Flag. Secondary PID controller 422 is also capable of sending a signal to primary PID controller 412 via feedback signal line 440 to set or reset the High Integral Limit Flag in primary PID controller 412 whenever secondary PID controller 422 sets or resets its own High Integral Limit Flag.

When secondary PID controller 422 determines that its upper setpoint limit has been exceeded, secondary PID controller 422 sets its High Integral Limit Flag. Secondary PID controller 422 also sends a signal to primary PID controller 412 that sets the High Integral Limit Flag in primary PID controller 412. In an alternate embodiment, primary PID controller 412 is capable of sending a signal to secondary PID controller 422 via signal line SP2 to determine whether the High Integral Limit Flag in secondary PID controller 422 is set or reset. In this alternate embodiment, secondary PID controller 422 is capable of sending the set or reset status of its High Integral Limit Flag to primary PID controller 412 via feedback signal line 440 in response to such a request by primary PID controller 412.

In process step 505, primary PID controller 412 reads the contents of its High Integral Limit Flag. In decision step 510, primary PID controller 412 determines whether its High Integral Limit Flag is set or reset. If the High Integral Limit Flag is not set, then the upper limit of output signal for secondary PID controller 422 has not been exceeded. In that case, there is no need to exclude the integral calculation component from the current PID calculation performed by primary PID controller 412. Control therefore passes to process step 520, which confirms that the integral calculation component will not be limited in any manner. The integral calculation component will be included in the PID calculation performed by primary PID controller 412. The control algorithm continues in process step 530.

If decision step 510 determines that the High Integral Limit Flag is set, then the upper setpoint limit of secondary PID controller 422 has been exceeded. In that case, decision step 540 determines whether the inclusion of the current integral calculation component in the current PID calculation would cause the output signal of primary PID controller 412 to increase. If the inclusion of the current integral calculation component would not cause the output signal of primary PID controller 412 to increase, then the integral calculation component will not be limited in any manner and control passes to process step 520.

If the inclusion of the current integral calculation component would cause the output signal of primary PID controller 412 to increase, then decision step 550 determines whether the sum of the proportional calculation component and the derivative calculation component is less than the previous output signal of primary PID controller 412. If the sum of the proportional calculation component and the derivative calculation component is not less than the previous output signal of primary PID controller 412, then the integral calculation component will be fully limited (i.e., totally excluded) from the current PID calculation that primary PID controller 412 is making. Control therefore passes to process step 560 that confirms that the integral calculation component will be fully limited. The control algorithm then continues in process step 530.

If the sum of the proportional calculation component and the derivative calculation component is less than the previous output signal of primary PID controller 412, then decision step 570 determines whether including the current integral calculation component in the PID calculation performed by primary PID controller 412 will cause the current output signal of PID controller 412 to exceed its previous output signal. If the inclusion of the current integral calculation component in the PID calculation will not cause the current output signal of PID controller 412 to exceed its previous output signal, then the integral calculation component will not be limited in any manner and control passes to process step 520.

If the inclusion of the current integral calculation component in the PID calculation will cause the current output signal of PID controller 412 to exceed its previous output signal, then the integral calculation component will need to be partially limited and control passes to process step 580.

Process step 580 limits the contribution of the integral calculation component to the PID calculation by subtracting from the PID calculation any portion of the integral calculation component that causes the current output signal of PID controller 412 to exceed its previous output signal. Process step 580 may also accomplish the limitation of the integral calculation component by multiplying the integral calculation component by a scale factor that has an appropriate value between zero ("0") and one ("1"). The control algorithm then continues in process step 530.

In the high setpoint limit situation described above, the present invention provides the following results:

1. The integral calculation component will not be limited if the High Integral Limit Flag is not set.
2. The integral calculation component will not be limited if inclusion of the current integral calculation component will not cause the output signal of primary PID controller 412 to increase.
3. The integral calculation component will be fully limited
   (a) if inclusion of the current integral calculation component will cause the output signal of primary PID controller 412 to increase, and (b) if the sum of the proportional calculation component and the derivative calculation component is not less than the previous output signal of primary PID controller 412.

4. The integral calculation component will not be limited (a) if the sum of the proportional calculation component and the derivative calculation component is less than the previous output signal of primary PID controller 412, and (b) including the integral calculation component in the PID calculation would not cause the current output signal to exceed than the previous output signal.

5. The integral calculation component will be partially limited (a) if the sum of the proportional calculation component and the derivative calculation component is less than the previous output signal of primary PID controller 412, and (b) including the integral calculation component in the PID calculation would cause the current output signal to exceed than the previous output signal.

The embodiment of the present invention described above addresses situations where including the integral calculation component in the PID calculation will cause the current output signal to exceed an upper or high setpoint limit.

For the purpose of illustration, flow diagram 500 has been described with reference to primary PID controller 412 and secondary PID controller 422. The present invention can also be implemented in high setpoint limit situations using a primary PID controller 412 and an analog output unit 425 in those instances where analog output unit 425 possesses the capabilities of a secondary controller.

The present invention is also applicable to situations where including the integral calculation component in the PID calculation will cause the current output signal to be less than a lower or low setpoint limit.

Figure 6:
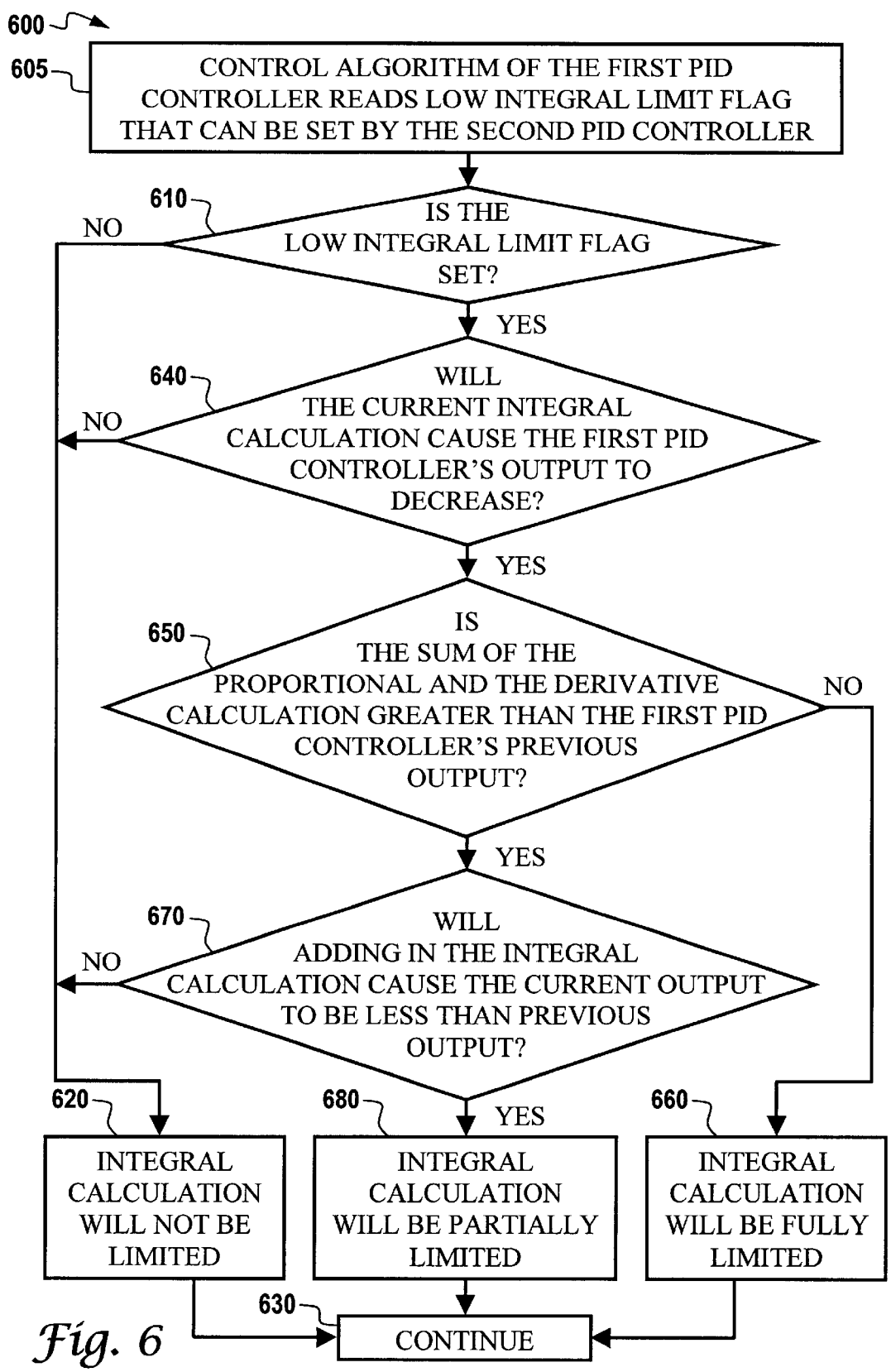
FIG. 6 is a flow diagram illustrating an alternate embodiment of the present invention for limiting the integral calculation component in a PID calculation in a primary PID controller that is coupled in cascade with a secondary PID controller that has a low setpoint limit.

FIG. 6 depicts flow diagram 600, which illustrates the operation of process controller 125 according to another embodiment of the present invention. The operation in flow diagram 600 limits the integral value contribution to a PID calculation in low setpoint limit situations. In low setpoint limit situations, a Low Integral Limit Flag is used in a manner analogous the High Integral Limit Flag previously described.

Primary PID controller 412 performs a PID calculation to determine what output signal that it will transfer to secondary PID controller 422. Secondary PID controller 422 is capable of determining whether the output signal that it received from primary PID controller 412 exceeds a lower setpoint limit for output signals that secondary PID controller 422 will transfer.

The control algorithm of primary PID controller 412 comprises a software accessible location which is capable of containing a digital numerical value ("1" or "0") representing the "set" and "reset" states, respectively, of a Low Integral Limit Flag. Secondary PID controller 422 also comprises a similar software accessible location containing a Low Integral Limit Flag. Secondary PID controller 422 is capable of setting or resetting its Low Integral Limit Flag. Secondary PID controller 422 is also capable of sending a signal to primary PID controller 412 via feedback signal line 440 to set or reset the Low Integral Limit Flag in primary PID controller 412 whenever secondary PID controller 422 sets or resets its own Low Integral Limit Flag.

When secondary PID controller 422 determines that its lower setpoint limit has been exceeded, secondary PID controller 422 "sets" its Low Integral Limit Flag. Secondary PID controller 422 also sends a signal to primary PID controller 412 that "sets" the Low Integral Limit Flag in primary PID controller 412.

In an alternate embodiment, primary PID controller 412 is capable of sending a signal to secondary PID controller 422 via signal line SP2 to determine whether the Low Integral Limit Flag in secondary PID controller 422 is set or reset. In this alternate embodiment, secondary PID controller 422 is capable of sending the set or reset status of its Low Integral Limit Flag to primary PID controller 412 via feedback signal line 440 in response to such a request by primary PID controller 412.

In process step 605, primary PID controller 412 reads the contents of its Low Integral Limit Flag. In decision step 610 primary PID controller 412 determines whether its Low Integral Limit Flag is set or reset. If the Low Integral Limit Flag is not set, then the lower limit of output signal for secondary PID controller 422 has not been exceeded. In that case, there is no need to exclude the integral calculation component from the current PID calculation that primary PID controller 412 is making. Control therefore passes to process step 620 that confirms that the integral calculation component will not be limited in any manner. The integral calculation component will be included in the PID calculation that primary PID controller 412 is making. The control algorithm continues in process step 630.

If decision step 610 determines that the Low Integral Limit Flag is set, then the lower limit of output signal for secondary PID controller 422 has been exceeded. In that case, decision step 640 determines whether the inclusion of the current integral calculation component in the current PID calculation would cause the output signal of primary PID controller 412 to decrease. If the inclusion of the current integral calculation component would not cause the output signal of primary PID controller 412 to decrease, then the integral calculation component will not be limited in any manner and control passes to process step 620.

If the inclusion of the current integral calculation component would cause the output signal of primary PID controller 412 to decrease, then decision step 650 determines whether the sum of the proportional calculation component and the derivative calculation component is greater than the previous output signal of primary PID controller 412. If the sum of the proportional calculation component and the derivative calculation component is not greater than the previous output signal of primary PID controller 412, then the integral calculation component will be fully limited (i.e., totally excluded) from the current PID calculation that primary PID controller 412 is making. Control therefore passes to process step 660 that confirms that the integral calculation component will be fully limited. The control algorithm then continues in process step 630.

If the sum of the proportional calculation component and the derivative calculation component is greater than the previous output signal of primary PID controller 412, then decision step 670 determines whether including the current integral calculation component in the PID calculation that primary PID controller 412 is making would cause the current output signal of PID controller 412 to be less than its previous output signal. If the inclusion of the current integral calculation component in the PID calculation would not cause the current output signal of PID controller 412 to be less than its previous output signal, then the integral calculation component will not be limited in any manner and control passes to process step 620.

If the inclusion of the current integral calculation component in the PID calculation would cause the current output signal of PID controller 412 to be less than its previous output signal, then the integral calculation component will need to be partially limited and control passes to process step 680.

Process step 680 limits the contribution of the integral calculation component to the PID calculation by subtracting from the PID calculation any portion of the integral calculation component that causes the current output signal of PID controller 412 to be less than its previous output signal. Process step 680 may also accomplish the limitation of the integral calculation component by multiplying the integral calculation component by a scale factor that has an appropriate value between zero ("0") and one ("1"). The control algorithm then continues in process step 630.

In the low setpoint limit situations described above, the present invention provides the following results:

1. The integral calculation component will not be limited if the Low Integral Limit Flag is not set.
2. The integral calculation component will not be limited if inclusion of the current integral calculation component will not cause the output signal of primary PID controller 412 to decrease.
3. The integral calculation component will be fully limited (a) if inclusion of the current integral calculation component will cause the output of primary PID controller 412 to decrease, and (b) if the sum of the proportional calculation component and the derivative calculation component is not greater than the previous output signal of primary PID controller 412.
4. The integral calculation component will not be limited (a) if the sum of the proportional calculation component and the derivative calculation component is greater than the previous output signal of primary PID controller 412, and (b) including the integral calculation component in the PID calculation would not cause the current output signal to be less than the previous output signal.
5. The integral calculation component will be partially limited (a) if the sum of the proportional calculation component and the derivative calculation component is greater than the previous output signal of primary PID controller 412, and (b) including the integral calculation component in the PID calculation would cause the current output signal to be less than the previous output signal.

The embodiment of the present invention described above addresses situations where including the integral calculation component in the PID calculation will cause the current output signal to exceed a lower or low setpoint limit.

For the purpose of illustration, flow diagram 600 has been described with reference to primary PID controller 412 and secondary PID controller 422. The present invention can also be implemented in low setpoint limit situations using a primary PID controller 412 and an analog output unit 425 in those instances where analog output unit 425 possesses the capabilities of a secondary controller.

Figure 7:
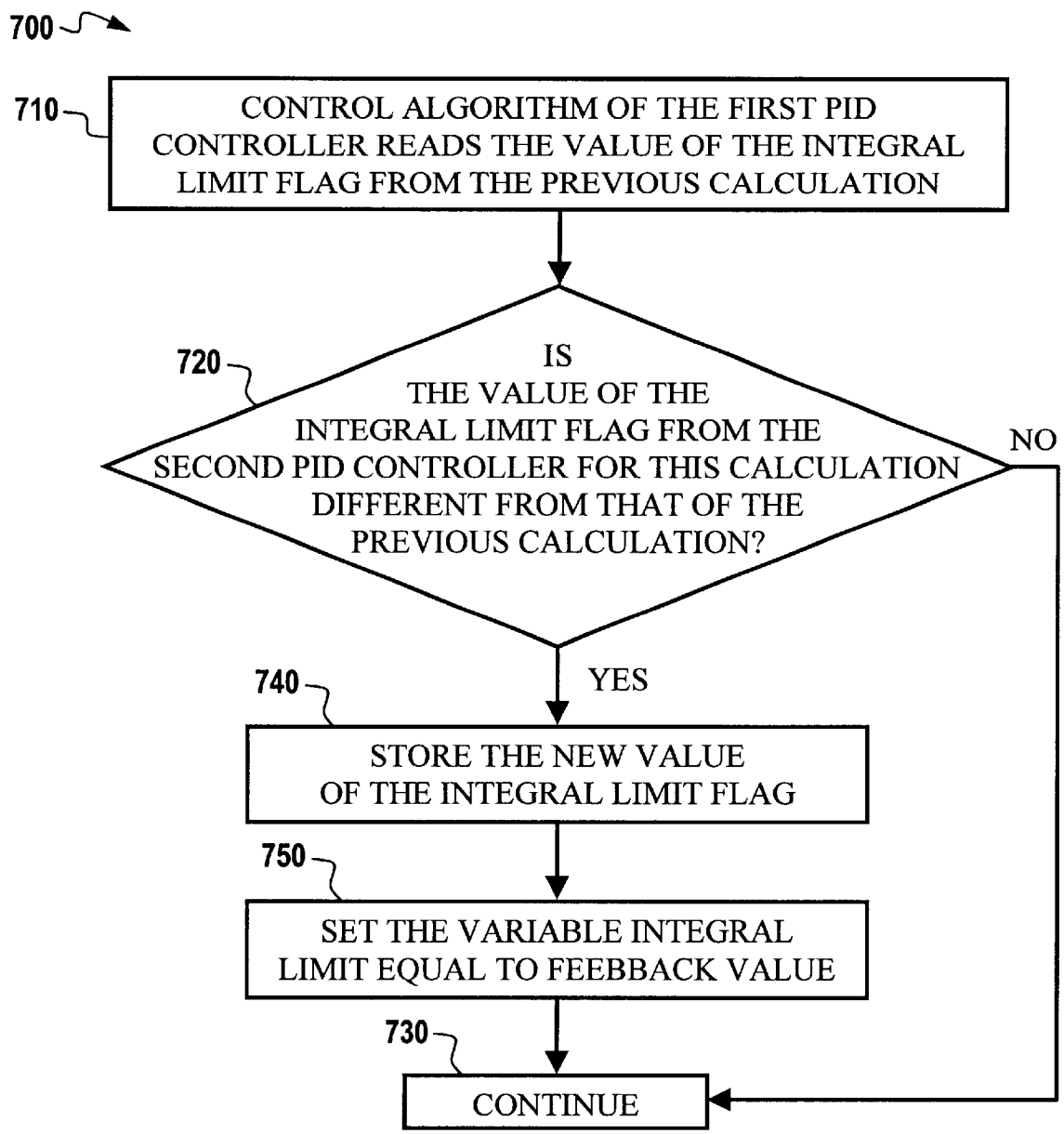
FIG. 7 is a flow diagram illustrating a first portion of an alternate embodiment of the present invention for limiting the integral calculation component in a PID calculation in a primary PID controller that is coupled in cascade with a secondary PID controller that may have both setpoint limits and output limits, and in which a limit may be either a high limit or a low limit, or in which both high and low limits are simultaneously applied.

FIG. 7 depicts flow diagram 700 illustrating a first portion of an alternate embodiment of the present invention for limiting the integral calculation component in a PID calculation in a primary PID controller that is coupled in cascade to a secondary PID controller in which (1) the limits may be either setpoint limits, or output limits, or both types of limits simultaneously, and in which (2) the limits may comprise either a high limit, or a low limit, or both high and low limits simultaneously. In such situations, the limits are referred to as "variable" limits. For the purpose of illustration, flow diagram 700 has been described with reference to the circuit shown in FIG. 4. That is, the primary PID controller shall be primary PID controller 412 and the secondary PID controller shall be secondary PID controller 422.

In "variable" limit situations an Integral Limit Flag is used in a manner analogous the High Integral Limit Flag and the Low Integral Limit Flag previously described. The Integral Limit Flag may contain any one of four values: (1) "not limited" or (2) "high limited" or (3) "low limited" or (4) "high and low limited."

This alternate embodiment of the present invention (for use with variable limits) utilizes a Variable Integral Limit to determine the level of limitation to be placed upon the integral calculation component in a PID calculation. The Variable Integral Limit is a numerical value having the units of the output of a PID controller. The Variable Integral Limit establishes a limit of PID controller output beyond which the integral calculation component will not be included in the current PID calculation. The initial value of the Variable Integral Limit is the second setpoint value SP2 for secondary PID controller 422. When that value is not available, the initial value of the Variable Integral Limit will be the value of the previous PID calculation of primary PID controller 412.

A new value of the Variable Integral Limit is established when primary PID controller 412 receives a signal from secondary PID controller 422 indicating that (1) the output signal of primary PID controller 412 is outside of the setpoint limits of secondary PID controller 422, or (2) the output signal of secondary PID controller 422 is outside of the output limits of secondary PID controller 422. The new value of the Variable Integral Limit is set equal to the value of the feedback signal of secondary PID controller 422.

In process step 710, the control algorithm of primary PID controller 412 reads the value of the Integral Limit Flag from memory. The value of the Integral Limit Flag contained in memory is the value of the Integral Limit Flag from the previous PID calculation In decision step 720 primary PID controller 412 determines whether the Integral Limit Flag from secondary PID controller 422 for the current PID calculation is different from the Integral Limit Flag from the previous PID calculation.

If the Integral Limit Flag from secondary PID controller 412 is not different (i.e., it has not changed), then there is no need to change the Variable Integral Limit in the current PID calculation that primary PID controller 412 is making. Control then passes to process step 730 and the value of the Variable Integral Limit remains unchanged.

If decision step 720 determines that the Integral Limit Flag from secondary PID controller 422 for the current PID calculation is different from the Integral Limit Flag from the previous PID calculation, then process step 740 causes the new value of the Integral Limit Flag to be stored in memory. Control then passes to process step 750. Process step 750 sets the value of the Variable Integral Limit equal to the feedback value. Control then passes to process step 730.

Figure 8:
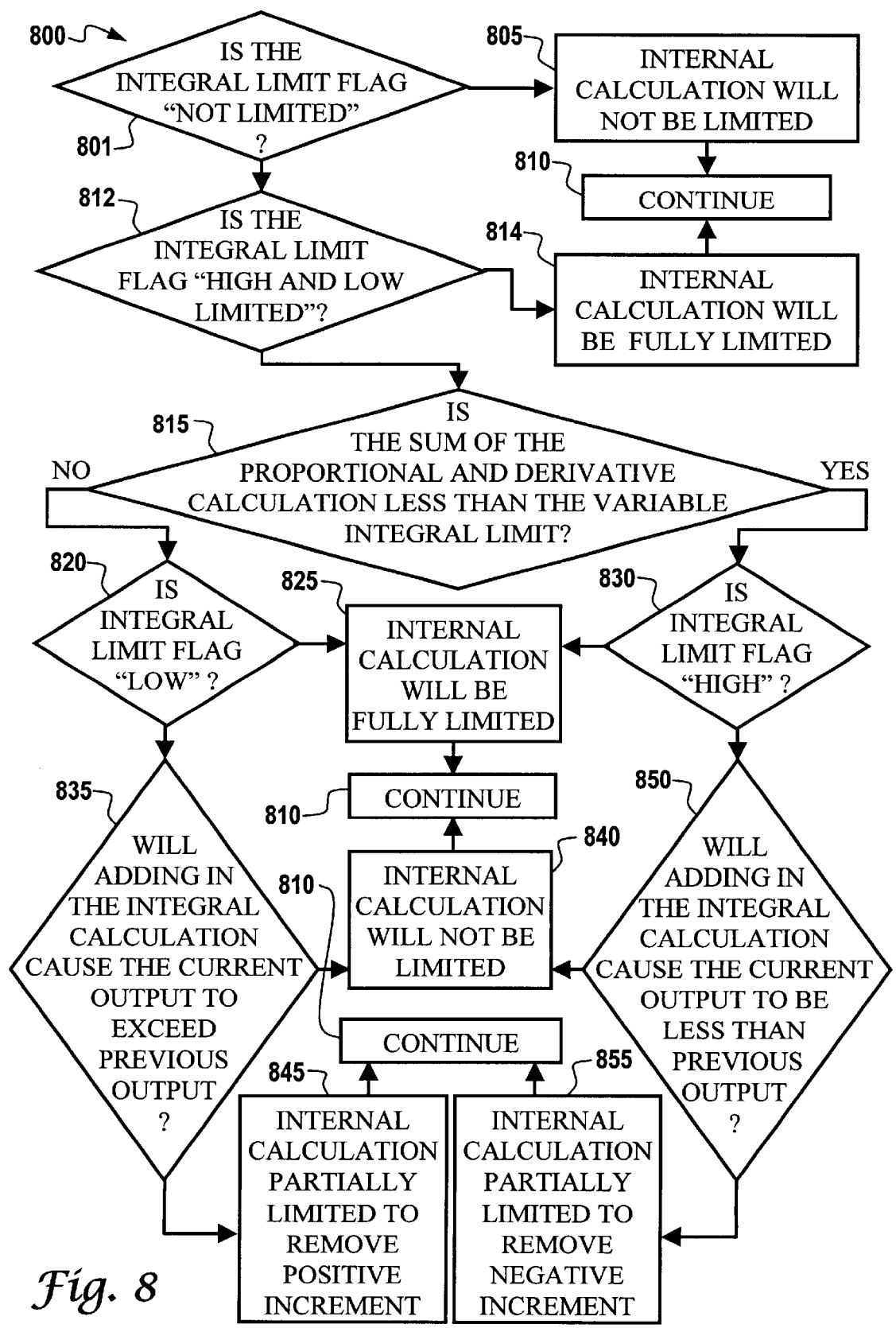
FIG. 8 is a flow diagram illustrating a second portion of an alternate embodiment of the present invention for limiting the integral calculation component in a PID calculation in a primary PID controller that is coupled in cascade with a secondary PID controller that may have both setpoint limits and output limits, and in which a limit may be either a high limit or a low limit, or in which both high and low limits are simultaneously applied.

Process step 730 shown in FIG. 7 passes control to the next portion of the control algorithm shown in FIG. 8. FIG. 8 depicts flow diagram 800 illustrating a second portion of an alternate embodiment of the present invention for limiting the integral calculation component to a PID calculation in a primary PID controller that is coupled in cascade to a secondary PID controller in which (1) the limits may be either setpoint limits, or output limits, or both types of limits simultaneously, and in which (2) the limits may comprise either a high limit, or a low limit, or both high and low limits simultaneously. Specifically, process step 730 passes control to decision step 801.

Decision step 801 determines whether the value in the Integral Limit Flag is the value "not limited." If the value is "not limited," then there is no need to exclude the integral calculation component from the current PID calculation that primary PID controller 412 is making. Control therefore passes to process step 805 that confirms that the integral calculation component will not be limited in any manner. The integral calculation component will be included in the PID calculation that primary PID controller 412 is making. Control then passes to process step 810.

If the value in the Integral Limit Flag is some value other than "not limited," control passes to decision step 812. Decision step 812 determines whether the value in the Integral Limit Flag is the value "high and low limited." If the value is "high and low limited," then there is a need to exclude the integral calculation component from the current PID calculation that primary PID controller 412 is making. Control therefore passes to process step 814 that confirms that the integral calculation component will be fully limited. The integral calculation component will be excluded from the PID calculation that primary PID controller 412 is making. Control then passes to process step 810.

If the value in the Integral Limit Flag is some value other than "high and low limited," control passes to decision step 815. The value in the Integral Limit Flag in such a case will be either "high limited" or "low limited." Decision step 815 determines whether the sum of the proportional calculation component and the derivative calculation component is less than the Variable Integral Limit. The value of the Variable Integral Limit will be equal to the feedback value in those cases where the Integral Limit Flag has changed from its value in a previous PID calculation as described above in connection with FIG. 7.

If the sum of the proportional calculation component and the derivative calculation component is not less than the Variable Integral Limit (i.e., is greater than or equal to the Variable Integral Limit), then decision step 820 determines whether the Integral Limit Flag is low. If the Integral Limit Flag is not low (i.e., is high) then the integral calculation component must be excluded from the current PID calculation that primary PID controller 412 is making. Control therefore passes to process step 825 that confirms that the integral calculation component will be fully limited (i.e., totally excluded). The integral calculation component will not be added to the PID calculation that primary PID controller 412 is making. Control then passes to process step 810.

Similarly, if decision step 815 determines that the sum of the proportional calculation component and the derivative calculation component is less than the Variable Integral Limit (i.e., is not greater than or equal to the Variable Integral Limit), then decision step 830 determines whether the Integral Limit Flag is high. If the Integral Limit Flag is not high (i.e., is low), then the integral calculation component must be excluded from the current PID calculation that primary PID controller 412 is making. Control therefore passes to process step 825 that confirms that the integral calculation component will be fully limited (i.e., totally excluded). The integral calculation component will not be added to the PID calculation that primary PID controller 412 is making. Control then passes to process step 810.

If decision step 820 determines that the Integral Limit Flag is low, control then passes to decision step 835. Decision step 835 determines whether including the current integral calculation component in the PID calculation that primary PID controller 412 is making would cause the current output signal of PID controller 412 to exceed its previous output signal. If the inclusion of the current integral calculation component in the PID calculation would not cause the current output signal of PID controller 412 to exceed its previous output signal, then the integral calculation component will not be limited in any manner and control passes to process step 840. Process step 840 confirms that the integral calculation component will not be limited. The integral calculation component will be included in the PID calculation that primary PID controller 412 is making. Control then passes to process step 810.

If the inclusion of the current integral calculation component in the PID calculation would cause the current output signal of PID controller 412 to exceed its previous output signal, then the integral calculation component will need to be partially limited and control passes to process step 845.

Process step 845 limits the contribution of the integral calculation component to the PID calculation by subtracting from the PID calculation any portion of the integral calculation component that causes the current output signal of PID controller 412 to exceed its previous output signal. Control then passes to process step 810.

Similarly, if decision step 830 determines that the Integral Limit Flag is high, control then passes to decision step 850. Decision step 850 determines whether adding the current integral calculation component to the PID calculation that primary PID controller 412 is making would cause the current output signal of PID controller 412 to be less than its previous output signal. If the inclusion of the current integral calculation component in the PID calculation would not cause the current output signal of PID controller 412 to be less than its previous output signal, then the integral calculation component will not be limited in any manner and control passes to process step 840. Process step 840 confirms that the integral calculation component will not be limited. The integral calculation component will be included in the PID calculation that primary PID controller 412 is making. Control then passes to process step 810.

If the inclusion of the current integral calculation component in the PID calculation would cause the current output signal of PID controller 412 to be less than its previous output signal, then the integral calculation component will need to be partially limited and control passes to process step 855.

Process step 855 limits the contribution of the integral calculation component in the PID calculation by subtracting from the PID calculation any portion of the integral calculation component that causes the current output signal of PID controller 412 to be less than its previous output signal. Control then passes to process step 810.

Although the present invention and its advantages have been described in detail, those skilled in the art should understand that they can make various changes, substitutions and alterations herein without departing from the spirit and scope of the invention in its broadest form.

What is claimed is:

1. A control apparatus for controlling a process, said control apparatus comprising:

a primary proportional, integral, differential (PID) controller capable of receiving a first setpoint and a first process variable and generating therefrom a second setpoint; and a secondary controller capable of receiving said second setpoint and a second process variable and generating therefrom an output control signal, wherein said primary PID controller is capable of receiving from said secondary controller a feedback signal that indicates that a previous value of said second setpoint exceeds a limit associated with said output control signal and that transfers a value of a signal from said secondary controller and, in response to said feedback signal indication, said primary PID controller one of:

excludes an integral calculation component of a PID calculation performed by said primary PID controller in response to a determination that the current sum of a proportional calculation component and a derivative calculation component of said PID calculation exceeds said previous value of said second setpoint; and includes a portion of said integral calculation component in response to a determination that the inclusion of said integral calculation component in said current PID calculation would otherwise cause said current value of said second setpoint to exceed said previous value of said second setpoint.

2. The control apparatus as set forth in claim 1 wherein said limit associated with said output control signal is an upper limit.

3. The control apparatus as set forth in claim 2 wherein said primary PID controller one of:

includes said integral calculation component of said PID calculation performed by said primary PID controller in response to a determination that the inclusion of said integral calculation component in said current PID calculation would not cause the current second setpoint of primary PID controller to exceed said previous value of said second setpoint; and includes said integral calculation component of said PID calculation performed by said primary PID controller in response to a determination that a high said primary PID controller integral limit flag has not been set.

4. The control apparatus as set forth in claim 1 wherein said limit associated with said output control signal comprises an upper limit and a lower limit.

5. The control apparatus as set forth in claim 1 wherein said limit associated with said output control signal is a lower limit.

6. The control apparatus as set forth in claim 3 wherein said primary PID controller one of:

includes said integral calculation component of said PID calculation performed by said primary PID controller in response to a determination that the inclusion of said integral calculation component in said current PID calculation would not cause the current second setpoint of primary PID controller to be less than said previous value of said second setpoint; and includes said integral calculation component of said PID calculation performed by said primary PID controller in response to a determination that a low integral limit flag has not been set.

7. A control apparatus as set forth in claim 1 wherein said limit associated with said output control signal is a variable integral limit, and wherein in response to said feedback signal indication, said primary PID controller one of:

excludes an integral calculation component of a PID calculation performed by said primary PID controller in response to a determination that the current sum of a proportional calculation component and a derivative calculation component of said PID calculation exceeds said previous value of said variable integral limit; and includes a portion of said integral calculation component in response to a determination that the inclusion of said integral calculation component in said current PID calculation would otherwise cause said current value of said second setpoint to exceed said previous value of said second setpoint.

8. The control apparatus as set forth in claim 7 wherein said primary PID controller one of:

includes said integral calculation component of said PID calculation performed by said primary PID controller in response to a determination that the inclusion of said integral calculation component in said current PID calculation would not cause the current second setpoint of primary PID controller to exceed said previous value of said second setpoint when a low integral limit flag has been set;

includes said integral calculation component of said PID calculation performed by said primary PID controller in response to a determination that the inclusion of said integral calculation component in said current PID calculation would not cause the current second setpoint of primary PID controller to be less than said previous value of said second setpoint when a high integral limit flag has been set; and includes said integral calculation component of said PID calculation performed by said primary PID controller in response to a determination that an integral limit flag has been set to a not limited status.

9. A process control system comprising at least one process controller, wherein said at least one process controller comprises:

a primary proportional, integral, differential (PID) controller capable of receiving a first setpoint and a first process variable and generating therefrom a second setpoint; and a secondary controller capable of receiving said second setpoint and a second process variable and generating therefrom an output control signal, wherein said primary PID controller is capable of receiving from said secondary controller a feedback signal that indicates that a previous value of said second setpoint exceeds a limit associated with said output control signal and that transfers a value of a signal from said secondary controller and, in response to said feedback signal indication, said primary PID controller one of:

excludes an integral calculation component of a PID calculation performed by said primary PID controller in response to a determination that the current sum of a proportional calculation component and a derivative calculation component of said PID calculation exceeds said previous value of said second setpoint; and includes a portion of said integral calculation component in response to a determination that the inclusion of said integral calculation component in said current PID calculation would otherwise cause said current value of said second setpoint to exceed said previous value of said second setpoint.

10. The process control system as set forth in claim 9 wherein said limit associated with said output control signal is an upper limit.

11. The process control system as set forth in claim 10 wherein said primary PID controller one of: includes said integral calculation component of said PID calculation performed by said primary PID controller in response to a determination that the inclusion of said integral calculation component in said current PID calculation would not cause the current second setpoint of primary PID controller to exceed said previous value of said second setpoint; and includes said integral calculation component of said PID calculation performed by said primary PID controller in response to a determination that a high integral limit flag has not been set.

12. The process control system as set forth in claim 9 wherein said limit associated with said output control signal comprises an upper limit and a lower limit.

13. The process control system as set forth in claim 9 wherein said limit associated with said output control signal is a lower limit.

14. The process control system as set forth in claim 13, wherein said primary PID controller one of: includes said integral calculation component of said PID calculation performed by said primary PID controller in response to a determination that the inclusion of said integral calculation component in said current PID calculation would not cause the current second setpoint of primary PID controller to be less than said previous value of said second setpoint; and includes said integral calculation component of said PID calculation performed by said primary PID controller in response to a determination that a low integral limit flag has not been set.

15. The process control system as set forth in claim 9 wherein said limit associated with said output control signal is a variable integral limit, and wherein in response to said feedback signal indication, said primary PID controller one of:

excludes an integral calculation component of a PID calculation performed by said primary PID controller in response to a determination that the current sum of a proportional calculation component and a derivative calculation component of said PID calculation exceeds said previous value of said variable integral limit; and includes a portion of said integral calculation component in response to a determination that the inclusion of said integral calculation component in said current PID calculation would otherwise cause said current value of said second setpoint to exceed said previous value of said second setpoint.

16. The process control system as set forth in claim 15 wherein said primary PID controller one of:

includes said integral calculation component of said PID calculation performed by said primary PID controller in response to a determination that the inclusion of said integral calculation component in said current PID calculation would not cause the current second setpoint of primary PID controller to exceed said previous value of said second setpoint when a low integral limit flag has been set;

includes said integral calculation component of said PID calculation performed by said primary PID controller in response to a determination that the inclusion of said integral calculation component in said current PID calculation would not cause the current second setpoint of primary PID controller to be less than said previous value of said second setpoint when a high integral limit flag has been set; and includes said integral calculation component of said PID calculation performed by said primary PID controller in response to a determination that an integral limit flag has been set to not limited.

17. In a control apparatus of the type comprising a primary proportional, integral, differential (PID) controller capable of receiving a first setpoint and a first process variable and generating therefrom a second setpoint, and a secondary controller capable of receiving said second setpoint and a second process variable and generating therefrom an output control signal, wherein said primary PID controller is capable of receiving from said secondary controller a feedback signal that indicates that a previous value of said second setpoint exceeds a limit associated with said output control signal and that transfers a value of a signal from said secondary controller, wherein said primary PID controller performs a PID calculation to determine the second setpoint that said primary PID controller sends to said secondary controller, and wherein said PID calculation includes a proportional calculation component and an integral calculation component and a differential calculation component, a method for limiting the contribution of said integral calculation component to said PID calculation when said secondary controller has determined that a previous second setpoint of said primary PID controller has exceeded a limit associated with said output control signal of said secondary controller, said method comprising the steps of:

excluding said integral calculation component of said PID calculation in response to a determination that the current sum of said proportional calculation component and said derivative calculation component of said PID calculation exceeds said previous value of said second setpoint; and including a portion of said integral calculation component in response to a determination that the presence of said unmodified integral calculation component in said current PID calculation would cause said current value of said second setpoint to exceed said previous value of said second setpoint.

18. The method as set forth in claim 17 further comprising the steps of:

determining whether the inclusion of said integral calculation component in said PID calculation will cause the current value of said second setpoint to exceed said previous value of said second setpoint;

including said integral calculation component in said current PID calculation in response to a determination that the inclusion of said integral calculation component in said PID calculation will not cause the current value of said second setpoint to exceed said previous value of said second setpoint;

determining whether the sum of the proportional calculation component and the derivative calculation component is less than said previous second setpoint of said primary PID controller in response to a determination that the inclusion of said integral calculation component in said PID calculation will cause the current value of said second setpoint to exceed said previous value of said second setpoint; and excluding said integral calculation component from said PID calculation in response to a determination that the current sum of said proportional calculation component and said derivative calculation component of said PID calculation is not less than said previous value of said second setpoint of said primary PID controller.

19. The method as set forth in claim 18 further comprising the steps of:

determining whether including said integral calculation component in said current PID calculation will cause the current second setpoint of said primary PID controller to exceed said previous value of said second setpoint of said primary PID controller in response to a determination that the current sum of said proportional calculation component and said derivative calculation component of said PID calculation is less than said previous value of said second setpoint of said primary PID controller;

including said integral calculation component in said current PID calculation in response to a determination the presence of said integral calculation component in said current PID calculation will not cause the current second setpoint of said primary PID controller to exceed said previous second setpoint of said primary PID controller; and partially limiting the contribution of said integral calculation component to said current PID calculation in response to a determination that the inclusion of said integral calculation component in said current PID calculation will cause the current second setpoint of said primary PID controller to exceed said previous value of said second setpoint of said primary PID controller.

20. The method as set forth in claim 19 wherein the step of partially limiting the contribution of said integral calculation component to said current PID calculation comprises:

subtracting from said PID calculation any portion of said integral calculation that causes said current second setpoint of said primary PID controller to exceed said previous second setpoint of said primary PID controller.

\* \* \* \* \*